(12) United States Patent
Shelton et al.

(10) Patent No.: US 7,116,567 B2
(45) Date of Patent: Oct. 3, 2006

(54) GAN SEMICONDUCTOR BASED VOLTAGE CONVERSION DEVICE

(75) Inventors: Bryan S. Shelton, Bound Brook, NJ (US); Boris Peres, Jersey City, NJ (US); Daniel McGlynn, Brooklyn, NY (US)

(73) Assignee: Velox Semiconductor Corporation, Somerset, NJ (US)

( * ) Notice: Subject to any disclaimer, the term of this patent is extended or adjusted under 35 U.S.C. 154(b) by 0 days.

(21) Appl. No.: 11/029,266

(22) Filed: Jan. 5, 2005

(65) Prior Publication Data

US 2006/0145674 A1    Jul. 6, 2006

(51) Int. Cl.
*H02H 3/20* (2006.01)
(52) U.S. Cl. .................................... 363/91.5
(58) Field of Classification Search ................ 361/18, 361/91.5, 91.1
See application file for complete search history.

(56) References Cited

U.S. PATENT DOCUMENTS 5,930,133 A * 7/1999 Morizuka ................. 363/126
6,610,003 B1 * 8/2003 Meloul et al. ............... 600/7
6,657,874 B1   12/2003 Yu
6,768,146 B1 * 7/2004 Yoshida ..................... 257/279

OTHER PUBLICATIONS

Ranbir Singh and James Richmond, "SiC Power Schottky Diodes in Power Factor Correction Circuits", Cree Power, CPWR-AN01 Rev -pp. 1-9.
M. Poschenrieder, F. Schulze, J. Blasing, A. Dadgar, A. Diez, J. Christen, A. Krost, "Bright Blue to Orange Photoluminescence Emission from High-Quality InGaN/GaN Multiple-Quantum-Wells on Si(111) Substrates", Applied Physics Letters, vol. 81, No. 9, Aug. 26, 2002.

* cited by examiner

*Primary Examiner*—Shawn Riley
(74) *Attorney, Agent, or Firm*—Lowenstein Sandler PC

(57) ABSTRACT

A converter is provided having an AC input and a DC output. The converter includes a rectifier that receives the AC input and that provides a rectifier output, a series connected current to magnetic field energy storage device and current interrupter connected across the rectifier output and a series connected gallium nitride diode and output charge storage device connected between a midpoint of the series connected magnetic field energy storage device and current interrupter and a terminal of the rectifier output and wherein the converter is characterized in not needing a transient voltage suppression circuit.

20 Claims, 7 Drawing Sheets

TRANSISTOR IN Si SYSTEM

CH1 Vds, CH2 Ids (2A/div)
Vin = 120Vdc, Vout = 300Vdc, Pout = 590W

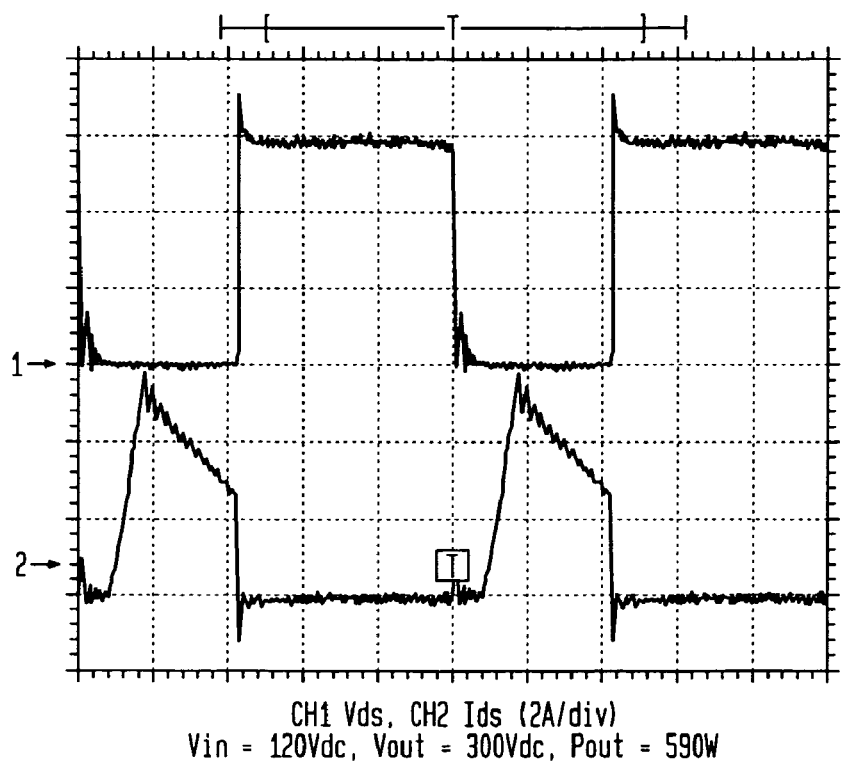

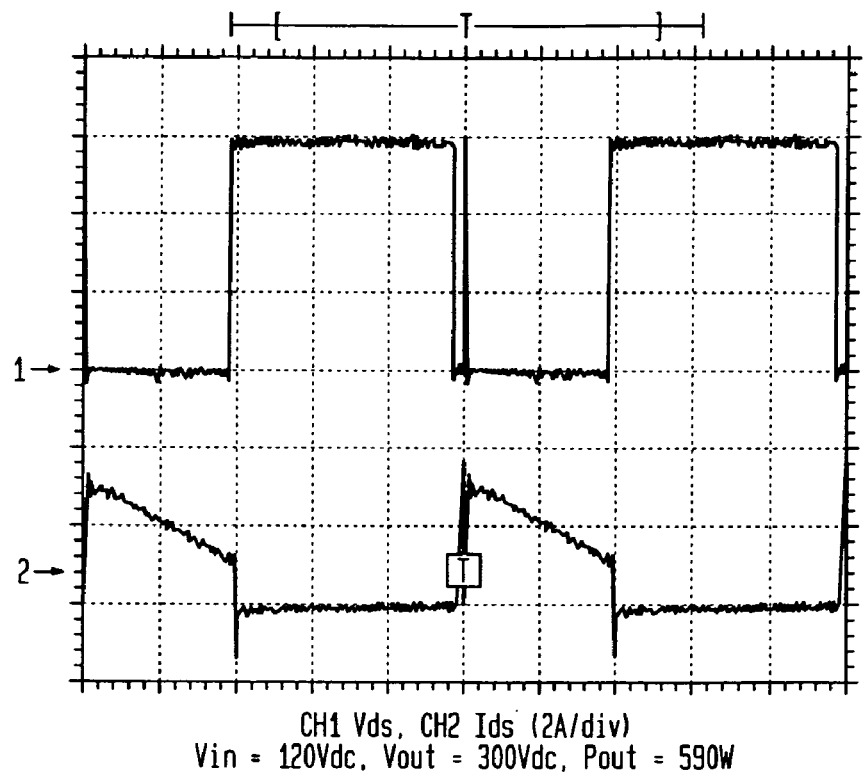

GAN SEMICONDUCTOR BASED VOLTAGE CONVERSION DEVICE

FIELD OF THE INVENTION

The field of the invention relates to power supplies and more particularly to voltage conversion circuits based on gallium nitride (GaN) semiconductor devices.

BACKGROUND OF THE INVENTION

Portable power supplies have become an increasingly important part of our society. Examples of where portable power supplies are needed include portable computers, cellular communication devices and video games.

Power supplies for portable devices are typically constructed from silicon semiconductors (e.g., silicon diodes). The pervasive use of silicon diodes, in no small part, is because of the inexpensive manner in which such devices can be fabricated.

While silicon diodes are inexpensive, they also suffer from a number of disadvantages. One of the biggest disadvantages is electrical noise. Silicon diodes, in fact, typically require the use of noise suppression (snubber) circuitry. However, the use of snubber circuitry results in a considerable increase in the size and weight of power supplies. Another disadvantage is the efficiency of the circuit, especially at high frequency, because of switching losses due to high reverse recovery times in the silicon devices.

Alternate materials, such as silicon carbide (SiC), have been proposed. The publicly available CREE Application Note No. CPWR-AN01 Rev, available from Cree, Inc. 4600 Silicon Dr., Durham, N.C. 27703 (Copyright 2002), asserts that SiC diodes could significantly reduce electrical noise and would be expected to eliminate the need for snubber circuits in some power supplies.

However, there are significant disadvantages to the use of SiC. One of the chief disadvantages of the use of SiC is cost. The relatively high cost makes the construction of power supplies with SiC diodes commercially unacceptable.

On the one hand, the use of SiC diodes in portable power supplies makes those power supplies smaller and lighter. On the other hand, the use of Si PiN diodes makes a power supply too heavy and may run hotter.

In addition, where SiC diodes have been described, their use has been limited. For example, U.S. Pat. No. 6,657,874 to Yu describes a voltage inverter that uses SiC diodes for reverse blocking of switching elements. Yu Differs from the subject matter of the invention in that Yu is directed to the generation of an AC output. Yu also differs in that the switching elements of the Yu inverter operate at a relatively low frequency (e.g., 60 Hz versus several kHz for the switching elements of power supplies providing a DC output).

One alternative material for making diodes that has not been generally recognized is gallium-nitride (GaN). However, prior uses of GaN has been limited to light emitting diodes (LEDs). Because of the importance of portable devices, a need exists for power supplies as small and light as those using SiC, but a cheap as those using Si PiN diodes.

SUMMARY

A converter is provided having an AC input and a DC output. The converter includes a rectifier that receives the AC input and that provides a rectified output, a series connected, current to magnetic field energy storage device and current interrupter connected across the rectifier output and a series connected gallium nitride diode and output charge storage device connected between a midpoint of the series connected magnetic field energy storage device and current interrupter and a terminal of the rectifier output and wherein the converter is characterized in not needing a transient voltage suppression circuit.

BRIEF DESCRIPTION OF THE DRAWINGS

FIGS. 7a–b depicts voltage/current tracings of a diode of the voltage converters of FIGS. 3 and 4.

DETAILED DESCRIPTION OF AN ILLUSTRATED EMBODIMENT

Figure 2:
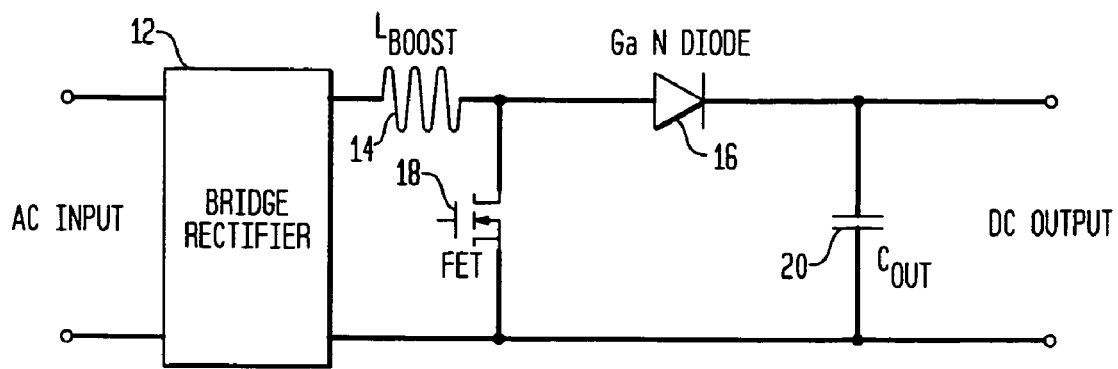
FIG. 2 depicts a voltage converter under an illustrated embodiment of the invention.

FIG. 2 depicts a voltage converter 10 under an illustrated embodiment of the invention. Included within the voltage converter 10 may be a rectifier (e.g., a bridge rectifier) 12, an inductor 14, a switching device 18 a diode 16 and an output charge storage device (e.g., a capacitor) 20.

The rectifier 12 may receive an alternating current (AC) input from an input power source (not shown) and provide a direct current (DC) output. A series connected inductor 14 and switching device 18 may be connected across the output of the rectifier 12. A series connected diode 16 and output capacitor 20 may be connected between a midpoint of the series connected inductor and switching device and terminal of the rectifier output (i.e., in parallel with the switching device).

Figure 1:
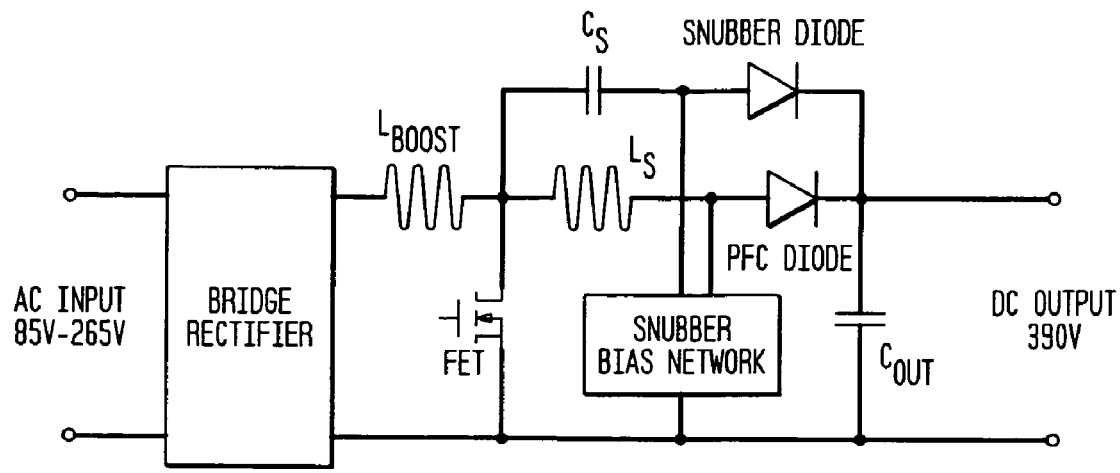
FIG. 1 depicts a prior art voltage converter with snubber network.

The switching device 18 (while being shown in FIG. 1 as being a FET) may be any switching element of reverse conductivity type. Examples of switching elements may include an Insulated Gate Bipolar Transistor (IGBT), a power Metal Oxide Semiconductor Field Effect Transistor (MOSFET), a thyristor, a Gate Turn-Off (GTO) thyristor, a Gate Commutated Turn-Off (GCT) thyristor, etc.

The diode 16 may be a Gallium-Nitride (GaN) diode. In general, GaN diodes have a wider band gap (which gives GaN diodes higher resistance to electrical breakdown per unit length of material), lower forward voltage drop, a smaller amount of reverse recovery electric charge, greater thermal stability and higher thermal conductivity than diodes made of silicon.

In the circuit of FIG. 2, the GaN diode 16 may have a forward voltage drop of less than 2 volts, a reverse breakdown voltage of greater than 500 volts and a current capacity of in excess of four amperes and more preferably approximately 8 amperes.

The use of a GaN diode 16 allows the converter 10 to be used in a number of applications that would not be possible if a Silicon (Si) PiN diode were used instead. For example, the converter 10 may have application in Continuous Conduction Mode (CCM) Power Factor Correction (PFC) power supply circuits.

CCM PFC power supplies have become important due to changing legal requirements directed to reducing noise in computer systems. CCM PFC circuits offer low RMS currents, are stable during operation under light loads and offer good synchronization with SMPS PWM circuits. However CCM PFC circuits require an ultrafast diode. In this regard, Si PiN diodes tend to store large amounts of minority carrier charge in the forward-biased state. The stored charge must be removed by carrier recombination before a Si PiN diode can turn off.

In contrast, it has been found that GaN diodes retain a very small zero reverse recovery charge, even at high temperatures, and consequently have a very fast switching time (less than 50 nanoseconds ns). In contrast, comparable Si PiN diodes require at least 100 ns to turn off and in the 600 volt range have a relatively large on-state voltage drop.

Even if possible, the use of a comparable Si PiN diode in the converter 10 of a CCM PFC would result in a significant increase in switching losses and device temperatures. The increased switching losses and device temperatures would require increased cooling or a de-rating of device operating parameters and, possibly, a larger diode to perform in a comparable manner.

Turning now to the converter 10, an explanation will be provided about the operation of the converter 10. In general, a controller (not shown) is connected to the switching device 18. The controller may provide a constant switching speed or a variable switching speed based upon a load connected to the DC OUTPUT.

During use, each time the switching device 18 is activated, the voltage across the switching device 18 falls to a low level resulting in the output voltage of the rectifier 12 appearing across the inductor 14. The inductor 14 functions as a current to magnetic field energy storage device. Activation of the switching device 18 causes the inductor 18 to immediately begin storing energy in its magnetic field.

After a time period, the switch 18 is deactivated. Deactivation of the switch 18 causes an instantaneous voltage pulse to appear across the inductor. The summed voltage of the series-connected rectifier 12 and inductor are imposed across the series-connected diode 16 and capacitor 20. During this period, the inductor 14 releases its energy into the output capacitor 20 through the GaN diode 16 in the form of a pulse of current. Thereafter, the diode 16 may become reverse bias pending another pulse of current from the diode 16.

Figure 3:
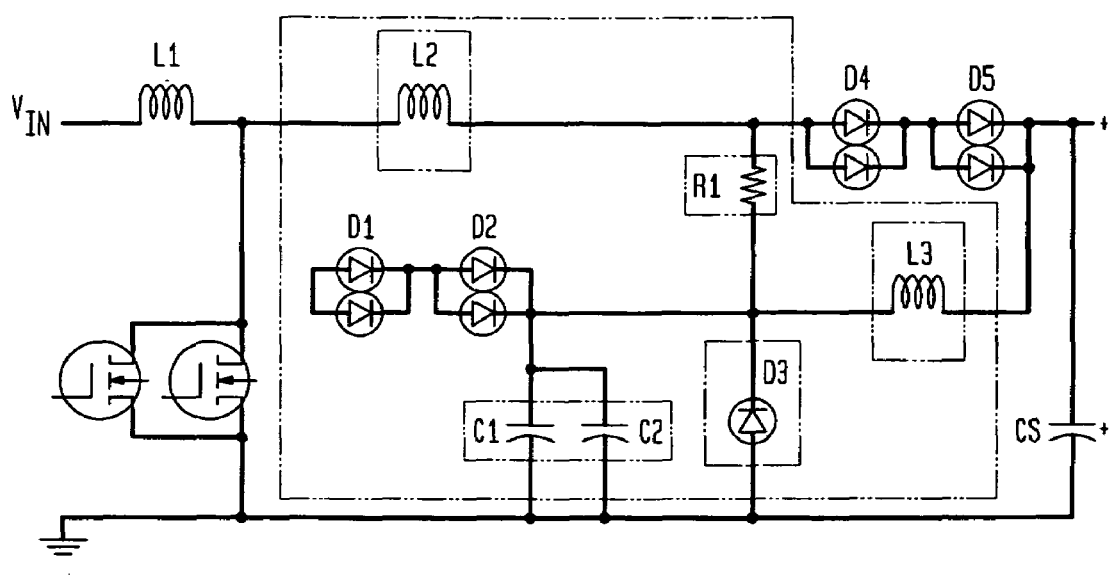
FIG. 3 depicts a prior art voltage converter using a Si PiN diode.

FIG. 3 shows a prior art converter using Si PiN diodes. As shown in FIG. 3, a snubber network 22 is required by this type of converter when Si PiN diodes are used.

Figure 4:
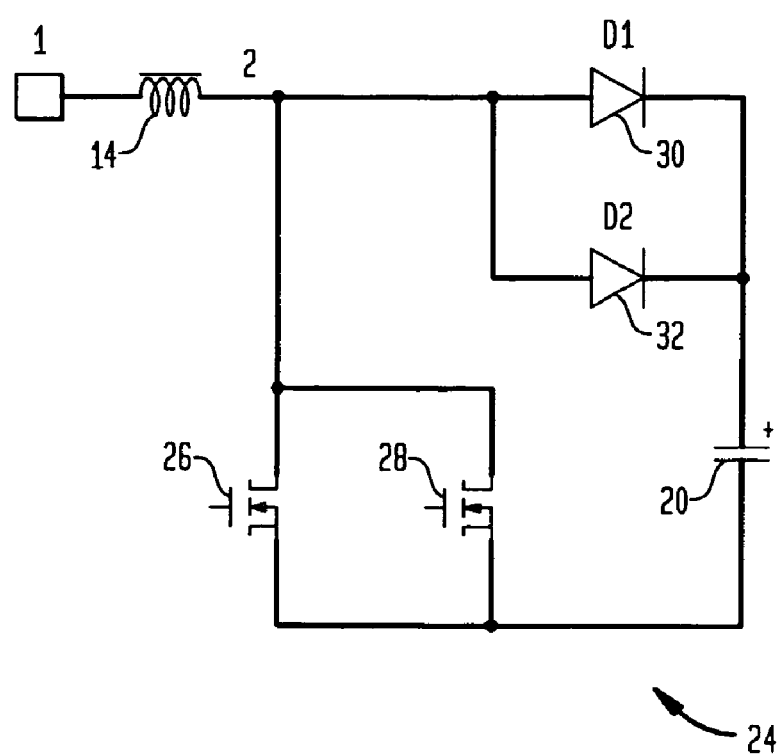
FIG. 4 depicts a voltage converter under an illustrated embodiment of the invention.

FIG. 4 shows a DC to DC converter 24 that is comparable in performance to the converter of FIG. 3, but which does not require the snubber network 22. The DC to DC converters of FIGS. 3 and 4 may be specific examples of the DC to DC converters that could be used in FIGS. 1 and 2 respectively. The diodes 30, 32 of FIG. 4 are model number M5338 GaN 500 volt diodes available from Emcore Corporation. The details of these diodes are described in the related U.S. patent application Ser. No. 11/030,554 filed Jan. 6, 2005 entitled "GALLIUM NITRIDE SEMICONDUCTOR DEVICES" and U.S. patent application Ser. No. 11/032,666 filed Jan. 10, 2005 entitled, "PACKAGE FOR GALLIUM NITRIDE SEMICONDUCTOR DEVICES".

Figure 5:
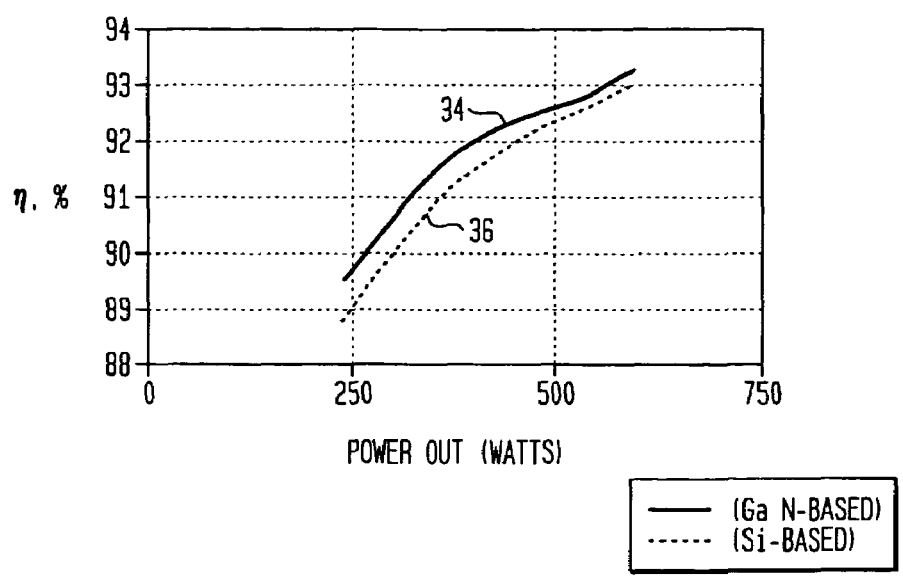
FIG. 5 depicts a graph of efficiencies of the voltage converters of FIGS. 3 and 4.

FIG. 5 depicts a comparison of the efficiency of the converters of FIGS. 3 and 4. As may be noted, throughout most of the operating range, the efficiency curve 34 of the GaN converter 24 was approximately one percentage point higher than the corresponding efficiency curve 36 of the Si converter of FIG. 3.

FIG. 6 are voltage and current graphs of a transistor in the Si PiN converter of FIG. 3 and the GaN converter of FIG. 4. FIG. 7 are voltage and current graphs of a Si PiN diode in the Si PiN converter of FIG. 3 and the GaN diodes 30, 32 of the converter 24 of FIG. 4.

As may be noted from FIGS. 6 and 7, activation of the switching device in the Si PiN converter of FIG. 3 results in a significant current spike when the switch is activated and the Si PiN diode becomes reverse biased. No such spike is seen in the current/voltage tracing for the GaN converter 24 of FIG. 4.

Figure 6A:
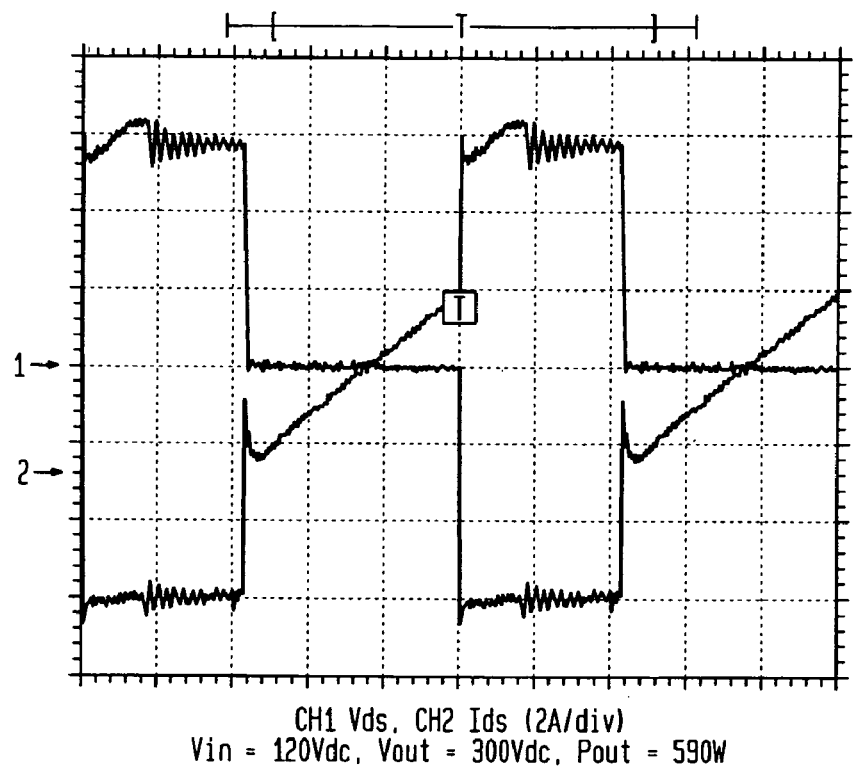
FIGS. 6a–b depicts voltage/current tracings of a transistor of the voltage converters of FIGS. 3 and 4.

As may be particularly noted in FIG. 6a, switching of the transistors of FIG. 3 resulted in considerable "ringing" of the voltage and current levels after the transistors were deactivated. The ringing, in effect, is a relatively high frequency oscillation caused by the exchange of energy between the junction capacitances of the Si PiN diode and switching devices of FIG. 3. As may be noted, the ringing persists for approximately 50% of the conduction cycle of the Si PiN diode and represents a noise source that cannot be tolerated in many newly developed power converters (e.g., CCM-PFC converters).

Figure 6B:
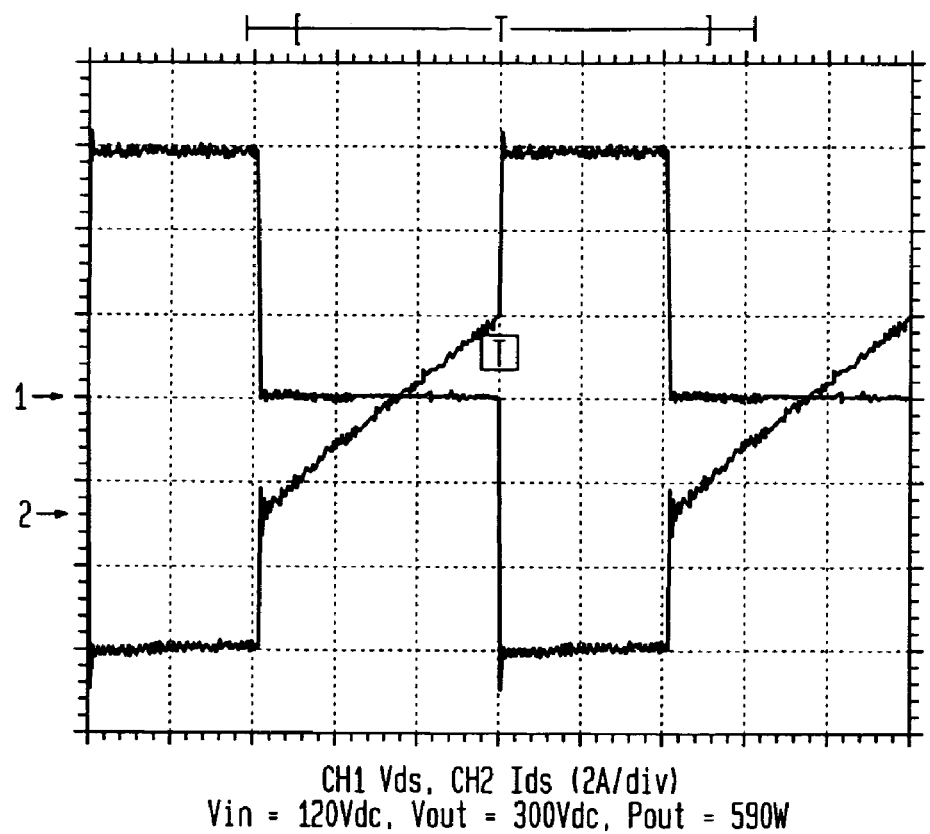

It should also be noted that the ringing shown in FIG. 6a occurs in spite of the fact that the converter of FIG. 3 contains a relatively sophisticated snubber circuit 22. In contrast FIG. 6b shows substantially no ringing, in spite of the fact that the converter of FIG. 4 does not have any snubbing devices.

As may be observed from FIGS. 5–7, the use of GaN diodes result in a considerable improvement in the efficiency and performance of voltage converters using GaN diodes. Not only is the efficiency improved, but the addition of the GaN diodes results in a considerable simplification of the circuit of the voltage converter.

For example, FIGS. 5–7 show that even with the considerable complexity of conventional snubber technology, a power supply that uses silicon diodes cannot provide the same performance regarding noise reduction. Further, the inherent "ringing" of silicon diodes results in noise that can combine with a variable switching rate to provide noise peaks that are dependent upon the loading of the power supply. Power supplies made of GaN diodes inherently avoid these problems.

In addition, the absence of "ringing" in GaN diodes results in a lower operating temperature. The lower operating temperature allows power supplies based upon GaN diodes to be constructed with less regard to cooling. The greater efficiency also results in longer battery life in the case of portable devices.

A specific embodiment of a voltage converter has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A converter having an AC input and a DC output, said converter comprising:

a rectifier that receives the AC input and that provides a rectifier output;

a series connected current to magnetic field energy storage device and current interrupter connected across the rectifier output; and a series connected gallium nitride diode and output charge storage device connected between a midpoint of the series connected magnetic field energy storage device and current interrupter and a terminal of the rectifier output and wherein the converter is characterized in not needing a transient voltage suppression circuit since said diode is selected to substantially eliminate ringing otherwise occurring in the circuit.

2. The converter as in claim 1 wherein the rectifier further comprises a bridge rectifier.

3. The converter as in claim 1 wherein the current to magnetic field energy storage device further comprises an inductor.

4. The converter as in claim 1 wherein the current interrupter further comprises a field effect transistor.

5. The converter as in claim 1 wherein the output charge storage device further comprises a capacitor.

6. The converter of claim 1 wherein the gallium nitride diode further comprises a Schottky diode.

7. The converter of claim 1, being one of an inverter circuit, a converter circuit, a matrix converter circuit and an AC switching circuit.

8. A converter embedded within a power supply comprising:

a gallium nitride diode that receives a varying input voltage from a power source of the power supply and that rectifies the varying input voltage to provide a relatively constant output voltage; and a capacitor that filters the relatively constant output voltage connected directly to and in series with the gallium nitride diode, said series connected gallium nitride diode and capacitor being coupled across the varying input voltage and the relatively constant output voltage being provided across the capacitor and wherein the gallium nitride diode has a forward voltage drop of less than three volts, a reverse breakdown voltage of greater than 500 volts and a current capacity in excess of four amperes since said diode is selected to substantially eliminate ringing otherwise occurring in the circuit.

9. The converter of claim 8 wherein the varying input voltage is provided by the activation and deactivation of a switching element connected in parallel with the series connected capacitor and gallium nitride diode.

10. The converter of claim 9 wherein the switching element is connected in series with an inductor and wherein the series connected inductor and switching element are connected across a set of terminals of a DC output of the power supply.

11. The converter of claim 10, wherein said diode is connected to at least one of an anode side and a cathode side of said switching element.

12. The converter of claim 9, wherein said diode is a Schottky diode.

13. The converter of claim 10, wherein said switching element is one of an IGBT (Insulated Gate Bipolar Transistor), a power MOSFET, a bipolar power transistor, a thyristor, a GTO (Gate Turn-Off) thyristor and a GCT (Gate Commutated Turn-Off) thyristor.

14. The converter of claim 8 wherein a current capacity of the gallium nitride diode further comprises approximately eight amperes.

15. A converter having a DC input and a DC output, said converter comprising: a series connected inductor and switch connected across a set of terminals of the DC input; and a series connected gallium nitride diode and output capacitor connected to a set of opposing terminals of the switch and wherein the converter is characterized in not needing or having a transient voltage suppression circuit since said diode is selected to substantially eliminate ringing otherwise occurring in the circuit.

16. The converter as in claim 15 wherein the gallium nitride diode has a forward voltage drop of less than three volts, a reverse breakdown voltage of greater than 500 volts and a current capacity in excess of four amperes.

17. The semiconductor power converter circuit according to claim 15, wherein said diode is a Schottky diode.

18. The semiconductor power converter circuit according to claim 15, wherein said diode is connected to at least one of an anode side and a cathode side of said switch.

19. The semiconductor power converter circuit according to claim 15, wherein said switch is one of an IGBT (Insulated Gate Bipolar Transistor), a power MOSFET, a bipolar power transistor, a thyristor, a GTO (Gate Turn-Off) thyristor and a GCT (Gate Commutated Turn-Off) thyristor.

20. The semiconductor power converter circuit according to claim 15, being one of an inverter circuit, a converter circuit, a matrix converter circuit and an AC switching circuit.

* * * * *